(12) United States Patent
Yoshida

(10) Patent No.: US 8,561,432 B2
(45) Date of Patent: Oct. 22, 2013

(54) APPARATUS FOR FABRICATING POROUS GLASS PREFORM

(75) Inventor: Makoto Yoshida, Kamisu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 123 days.

(21) Appl. No.: 13/236,395

(22) Filed: Sep. 19, 2011

(65) Prior Publication Data

US 2012/0073333 A1    Mar. 29, 2012

(30) Foreign Application Priority Data

Sep. 24, 2010   (JP) ................................ 2010-213678

(51) Int. Cl.
*C03B 37/018*   (2006.01)

(52) U.S. Cl.
USPC .............................. 65/531; 65/488; 110/336

(58) Field of Classification Search
None
See application file for complete search history.

(56) References Cited

U.S. PATENT DOCUMENTS

| | | | | |
|---|---|---|---|---|
| 4,385,700 | A * | 5/1983 | Hodges et al. | 209/539 |
| 6,074,206 | A * | 6/2000 | Lauersdorf | 432/251 |
| 2002/0125829 | A1 | 9/2002 | Vella | 315/111.81 |
| 2002/0194879 | A1 * | 12/2002 | Takei et al. | 65/413 |
| 2004/0163337 | A1 * | 8/2004 | Claerbout | 52/167.1 |
| 2007/0180828 | A1 * | 8/2007 | Webb | 60/752 |
| 2007/0240455 | A1 * | 10/2007 | Kang et al. | 65/529 |

FOREIGN PATENT DOCUMENTS

| | | |
|---|---|---|
| EP | 1997944 A1 * | 12/2008 |
| JP | 03115510 A * | 5/1991 |
| JP | H03-115510 | 5/1991 |
| JP | H05-157653 | 6/1993 |
| JP | 2000-007366 | 1/2000 |
| JP | 2001-010823 | 1/2001 |
| JP | 2003-192356 | 7/2003 |

OTHER PUBLICATIONS

Krigger et al., Energy Efficiency, Quality Books, Inc. copyright 2008, p. 85.*
Japanese Office Action dated Dec. 19, 2012, issued in related Japanese Patent Application No. 2010-213678, with English translation.

* cited by examiner

*Primary Examiner* — Matthew Daniels
*Assistant Examiner* — Lisa Herring
(74) *Attorney, Agent, or Firm* — Workman Nydegger

(57) ABSTRACT

The present invention provides an apparatus for fabricating porous glass preforms, in which any damages of a reaction vessel due to the increase in thermal load to the reaction vessel can be controlled without enlarging the reaction vessel. A wall of the reaction vessel includes a plurality of rectangular inner wall metal plates that defines at least apart of inner side walls of the reaction vessel, adjacent inner wall metal plates of a plurality of inner wall metal plates of which being weld bonded at their edges, and a plurality of metal frame members having higher stiffness than that of the inner wall metal plates and being arranged along each edge region of the opposite surface of the inner side walls of each of the plurality of inner wall metal plates and fixed to the edge region by a tightening or welding means.

18 Claims, 5 Drawing Sheets

APPARATUS FOR FABRICATING POROUS GLASS PREFORM

CROSS-REFERENCE TO RELATED APPLICATIONS

This application claims the benefit of Japanese Patent Application No. 2010-213678 filed Sep. 24, 2010, which is hereby incorporated by reference herein in its entirety.

BACKGROUND OF THE INVENTION

1. Field of the Invention

The present invention relates to an apparatus for fabricating porous glass preforms by depositing glass particles onto a deposition base material that are generated by a flame hydrolysis or oxidation reaction using a burner, and more particularly, to a structure of a reaction vessel used for synthesizing the glass particles.

2. Description of the Related Art

Optical fibers are fabricated by reducing the diameter of a large diameter glass preform into a glass rod having a diameter appropriate for fiber-drawing and then drawing the glass rod. The large diameter glass preform is obtained by heat treating a porous glass preform fabricated with the VAD (Vapor phase axial deposition) method or OVD (Outside Vapor Deposition) method so as to sinter and make transparent the glass.

Recently, larger porous glass preforms requires larger fabricating devices and large volume gas needed to manufacture the preforms. The larger fabricating devices in turn require larger installation area, leading to higher cost. If the devices are not made larger, lower equipment cost and smaller installation area is available, and fabricating costs can be controlled, but the increase in thermal load to a reaction vessel would be problematic.

The increase in heat caused by the enlargement of a porous glass preform can increase thermal stress to the reaction vessel, damage the reaction vessel, and cause a serious effect on the reaction vessel's life. When the reaction vessel is damaged, small fragments of plate materials and thermal insulation materials constituting the reaction vessel may float in atmosphere in the reaction vessel and be mixed into soot bodies, resulting in the increase in transmission loss and the break of the final product, an optical fiber.

In order to prolong the reaction vessel's life, it is necessary to reduce heat to which the reaction vessel is subjected. However, the reduction of combustion gas for cutting the heat leads to the decrease in the density of the soot bodies, resulting in damages of the soot bodies during fabricating process or transportation. Furthermore, the decrease in the density will thicken the outer diameter of the soot bodies and require much larger devices in the successive process.

The Japanese Patent Laid-Open No. 2001-010823 discloses a method for water-cooling a reaction vessel as a way of preventing damages of the reaction vessel without enlarging it. However, the method requires a water-cooling mechanism and can cause a new problem of high cost due to the additional cooling water facility and of additional spaces due to the enlargement of a device. The Japanese Patent No. 3674315 discloses a method for preventing damages of the reaction vessel by adding a portion to the reaction vessel itself for releasing stress concentration. The Japanese Patent Laid-Open No. 2003-192356 discloses another method for preventing damages of the reaction vessel by fastening a part of the vessel on a floor and enabling other parts of the reaction vessel to slide to release stress concentration due to the device' heat expansion. The last method is effective for reaction vessels in which any members are not welded to each other. However, with this method, reaction vessels composed of members made by welding a plurality of metal members may crack at the weakest weld when fixed at one location and extended and contracted widely.

SUMMARY OF THE INVENTION

The present invention provides an apparatus for fabricating porous glass preforms, in which any damages of a reaction vessel due to the increase in thermal load to the reaction vessel caused by the enlargement of the porous glass preforms can be controlled without enlarging the vessel.

The present invention provides an apparatus for fabricating porous glass preforms by depositing glass particles synthesized by a flame hydrolysis or oxidation reaction using a burner onto a deposition base material, having a reaction vessel used for forming the porous glass preforms, a wall of the reaction vessel including:

a plurality of rectangular inner wall metal plates having a surface that defines at least a part of inner side walls of the reaction vessel, adjacent inner wall metal plates of the plurality of inner wall metal plates being weld bonded at their edges; and a plurality of metal frame members having higher stiffness than that of the inner wall metal plates, being arranged along each edge region of an opposite surface of the inner side wall of each of the plurality of inner wall metal plates, and being fixed to the edge region by a tightening or welding means.

Preferably, the plurality of frame members include a frame member arranged along the weld of the adjacent inner wall metal plates, and an edge region along the weld of each of the adjacent inner wall metal plates is fixed on the frame member.

Further features of the present invention will become apparent from the following description of exemplary embodiments with reference to the attached drawings.

DESCRIPTION OF THE EMBODIMENTS

Embodiments according to the present invention will be described hereinafter with reference to attached drawings.

Figure 1:
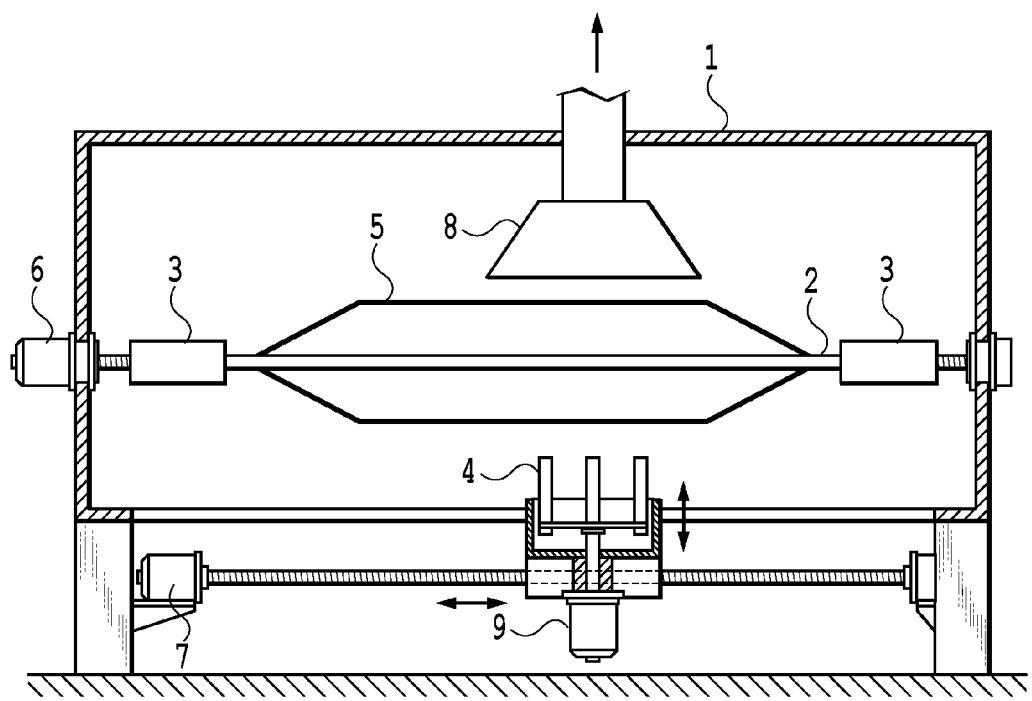
FIG. 1 is a schematic view of an exemplary manufacture apparatus according to the present invention.

FIG. 1 shows an example of an apparatus for fabricating porous glass preforms by OVD method according to the present invention. In a reaction vessel 1 of the apparatus, a base glass rod 2 of a starting base material is rotatably supported at the both end by base material grippers 3. A burner 4 for depositing glass particles (hereinafter, simply referred to as "burner") produces the particles (soot) through a flame reaction and sprays them around the surface of the base glass rod 2. Thus, the particles are deposited onto the rod 2 in a radial direction, forming a soot body 5. The burner 4 keeps moving back and forth horizontally along the longer direction of the rod 2 with the help of the rotation of a motor 7 and the base glass rod 2 keeps rotating with the help of the rotation of a rotary motor 6 in order to deposit the particles onto the rod 2 until the diameter of the soot body 5 reaches the predetermined outer diameter. During the process, the distance between the soot body 5 and the burner 4 is adjusted by the rotation of a motor 9, and exhaust gases are exhausted outside the vessel 1 through an exhaust hood 8.

The surface temperature of inner side walls of the vessel 1 is initially about room temperature, but reaches above 300 degrees Celsius on fabricating due to radiation from the soot body 5. In addition, the inner side walls are repeatedly subjected to heat cycles in which the burner 4 comes close to and moves away from the walls by moving along the base glass rod 2 in the longitudinal direction of the rod 2. As a result, the reaction vessel 1 repeatedly expands and contracts due to such temperature variations and sometimes ruptures at weak points, especially at welds of metal members.

First Embodiment

Figure 2:
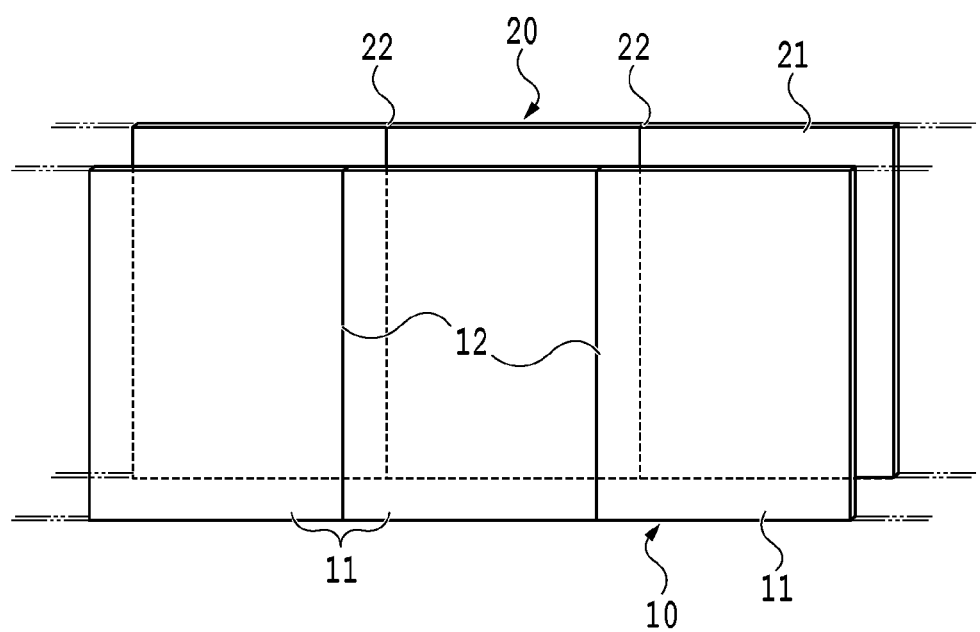
FIG. 2 is a view schematically illustrating the structure of a side wall of a reaction vessel.
Figure 3:
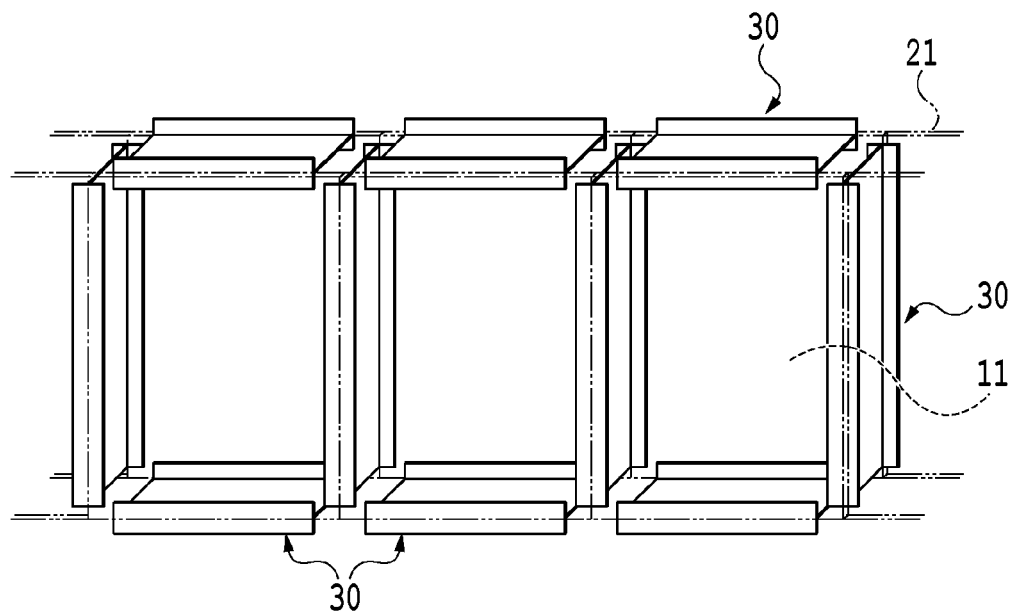
FIG. 3 is a view schematically illustrating a relationship between a frame and a metal plate.

In the first embodiment, the reaction vessel 1 has a structure for preventing the above rupture at the welds, which will be described with reference to FIGS. 2 to 4.

The wall structure of the reaction vessel 1 includes an inner wall member 10 comprised of a plurality of inner wall metal plates 11, an outer wall member 20 comprised of a plurality of outer metal plates 21, a plurality of frame members 30, and a plurality of heat insulating members 40. Note that the structure is applied to at least a part of a ceiling, side walls, or a bottom of the reaction vessel 1.

The inner wall member 10 is comprised of a plurality of rectangular inner wall metal plates 11 having a surface that defines at least a part of the inner side walls of the reaction vessel 1. Among the inner wall metal plates 11, adjacent inner wall metal plates 11 are weld bonded at their edges by welds 12. The inner wall metal plates 11 may be made of, for example, a nickel alloy with the thickness of 5 mm.

The outer wall material 20 is comprised of a plurality of rectangular outer wall metal plates 21 having a surface that defines at least a part of the outer side walls of the reaction vessel 1. Each of the plates 21 has a shape corresponding to that of the corresponding inner wall metal plate 11. The outer wall metal plates 21 are weld bonded at their edges by welds 22. The outer wall metal plates 21 may be made of, for example, a nickel alloy with the thickness of 5 mm.

A plurality of frame members 30 has higher stiffness than that of inner wall metal plates 11 and outer wall metal plate 21. As shown in FIG. 4, the members 30 have an H-shaped cross section, inner and outer flange 31 and 32 facing apart from each other, and connector 33 that extends along between the inner flange 31 and the outer flange 32 and connects them to each other. The frame members 30 may be made of, for example, an H-steel with the thickness of about 10 mm.

Figure 4:
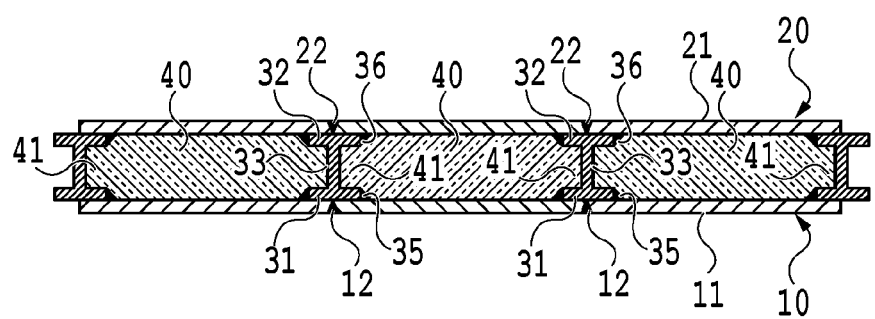
FIG. 4 is a cross sectional view illustrating the cross-section structure of the side wall of the reaction vessel.

As illustrated in FIG. 4, the inner flange 31 of the frame member 30 is arranged along the edge region of the back surface of the inner wall metal plate 11 opposite to the inner wall surface thereof and is fixed to the back surface of inner wall metal plate 11 by a weld 35. In other words, the member 30 is arranged such that its size corresponds with the size of the inner wall material plate 11. Also, the inner flange 31 of frame members 30 arranged along the weld 12 of adjacent inner wall metal plates 11 is commonly fixed at the edge regions of inner wall metal plates at the both sides of the weld 12. Thus, the fixing of the edge regions of the inner wall metal plates at the both sides of the weld 12 on a common inner flange 31 can constrain the weld 12 to the inner flange 31 and control forces acting on the weld 12 when the inner wall metal plate 11 is thermally transformed, so that the breaking of the weld 12 can be avoided.

As illustrated in FIG. 4, the outer flange 32 of the frame member 30 is arranged along the edge region of the back surface of the outer wall metal plate 11 opposite to the outer wall surface thereof and is fixed to the back surface of outer wall metal plate 21 by a weld 36. Also, the outer flange 32 of frame members 30 arranged along the weld 22 of adjacent outer wall metal plates 21 is commonly fixed at the edge regions of the outer wall metal plates at the both sides of the weld 22. It is noted that although in this embodiment the inner and outer wall metal plates 11 and 21 are fixed on the frame members 30 by welding, the fixing is not so limited and can be done by, for example, other welding methods such as spot welding and clamping means such as bolt clamping.

The heat insulating member 40 is surrounded at its four sides by a plurality of frame members 30 and is fitted in an space formed between the inner and outer wall metal plates 11 and 12. Specifically, the heat insulating member 40 has engagement parts 41 that engage in a concave portions defined by the inner flange 31, outer flange 32 and connector 33. The heat insulating member 40 prevents reaction heat produced in the reaction vessel 1 to be released outside it and gives strength to wall structures of the reaction vessel 1 thanks to be fitted in an area formed between the inner and outer wall metal plate 11 and 12. Preferably, the heat insulating member 40 is a silica-alumina based heat insulating member having high insulation properties, which is made mainly of aluminum oxide ($Al_2O_3$) and silicon oxide ($SiO_2$) and has the density between 80 and 150 kg/m$^3$. Heat shield members with the density lower than 80 kg/m$^3$ and those with the density higher than 150 kg/m$^3$ are not preferable because the former cannot give enough strength and the latter lowers heat insulation efficiencies due to higher heat conductivity.

Since frame members having relatively high stiffness are fixed on inner wall metal plates 11 and in particular, those at both sides of welds are fixed on common frame members, the wall structure of the reaction vessel according to the present embodiment can suppress damages due to changes in temperature at the welds.

Second Embodiment

Figure 5:
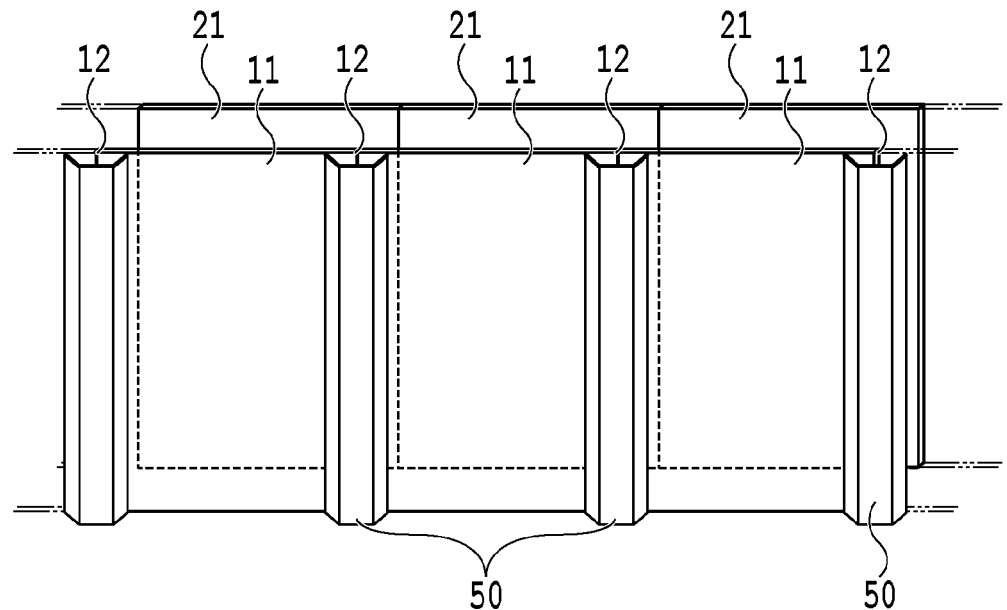
FIG. 5 is a diagrammatic representation illustrating the structure of a heat shield member.
Figure 6:
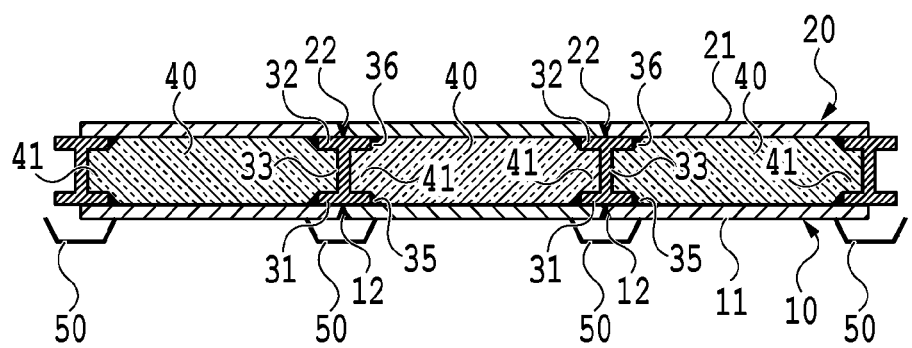
FIG. 6 is a cross sectional view illustrating the cross-section structures of a side wall of another reaction vessel having the heat shield member.

With reference to FIGS. 5 and 6, a wall structure of a reaction vessel according to the second embodiment will now be described, where similar numbers refer to similar elements in FIGS. 2 to 4.

The difference between the first and second embodiments is that heat shield members 50 are installed at the inner wall side of the inner wall metal plates 11 in the second embodiment. The members 50 may be made of, for example, thin nickel alloy plates with the thickness of such as less than 0.5 mm. The heat shield member 50 covers the weld 12 so as to decrease the impact of radiant heat on the weld 12, that is, so as to shield the radiant heat. The heat shield member 50 is formed from a metal plate curvature-processed such that a trapezoid cross section and a space between the heat shield member 50 and the weld 12 are formed. The space can prevent the heat of the heat shield member 50 in high temperature from being transferred to the weld 12.

In addition to the technical features of the first embodiment, the second embodiment has another technical feature that heat shield members 50 can suppress the increase in temperature of welds 12 and damages of the welds 12 can be more certainly controlled.

EXAMPLE

Figure 7:
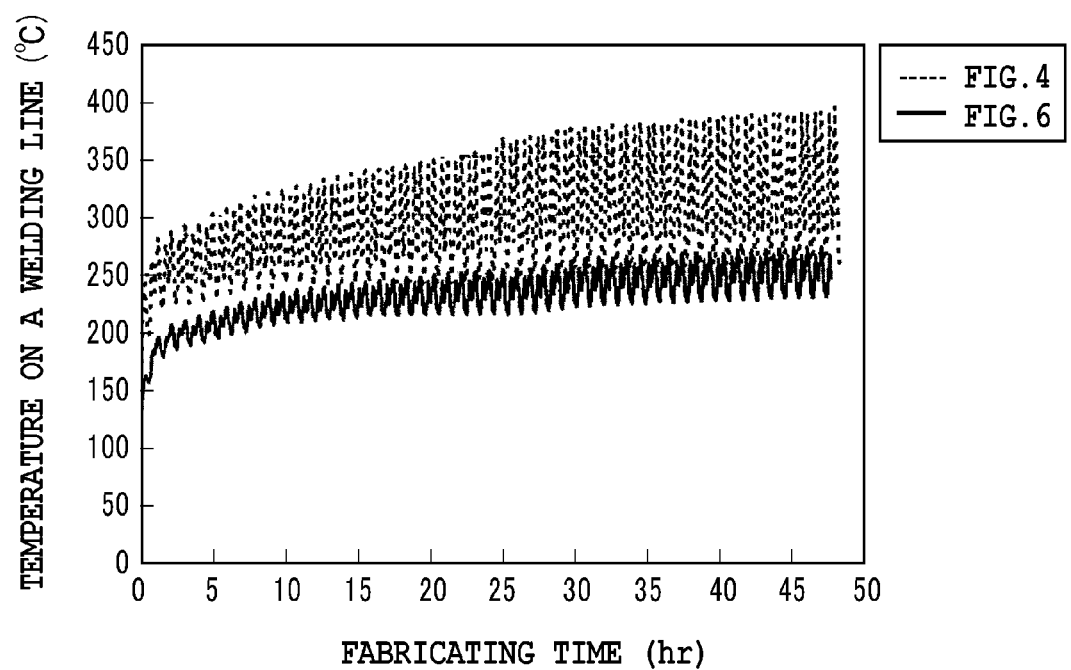
FIG. 7 is a graph showing temperature variations on weld lines of reaction vessels at the manufacture of preforms, comparing a reaction vessel having heat shield members and that having no such members.

FIG. 7 illustrates a graph of temperatures of a weld 12 measured in the cases of which a heat shield member 50 exists and which the heat shield member 50 does not exist. Note that the heat shield member 50 is formed by a nickel alloy plate with the thickness of 0.3 mm and the distance between the member 50 and the weld 12 is larger than 10 mm.

As shown in FIG. 7, the covering and heat-shielding of the weld 12 with the heat shield member 50 lowered the maximum temperature of the vessel from 400 to 270 degrees Celsius and significantly narrowed the temperature fluctuation range in fabricating.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An apparatus for fabricating porous glass preforms by depositing glass particles synthesized by a flame hydrolysis or oxidation reaction using a burner onto a deposition base material, the apparatus comprising a burner and a reaction vessel used for forming the porous glass preforms, a wall of the reaction vessel comprising:
a plurality of rectangular inner wall metal plates having an inner surface and an opposing outer surface, the inner surface defining at least a part of inner side walls of the reaction vessel, adjacent inner wall metal plates of the plurality of inner wall metal plates being weld bonded at their edges; and
a plurality of metal frame members having a higher stiffness than that of the inner wall metal plates, the metal frame members being positioned against the outer surface along each edge region of the plurality of inner wall metal plates, each metal frame member being fixed to the corresponding edge region by a tightening or welding means, so that all of the edge regions have a metal frame member fixed thereto.

2. The apparatus of claim 1, wherein at least one frame member of the plurality of frame members that is arranged along a weld of the adjacent inner wall metal plates is commonly fixed at an edge region of inner wall metal plates at the both sides of the weld.

3. The apparatus of claim 2, wherein the wall of the reaction vessel further comprises a plurality of outer wall metal plates that define at least a part of outer side walls of the reaction vessel, the outer wall metal plates having an inner surface facing the outer surface of the inner wall metal plates and an opposing outer surface, the outer wall metal plates having shapes corresponding to those of the inner wall metal plates, wherein for each of the plurality of outer wall metal plates, the frame members are positioned against the inner surface of the outer wall metal plate and fixed at each edge region of the outer wall metal plate corresponding to an edge region of the inner wall metal plate.

4. The apparatus of claim 3, further comprising a plurality of heat insulating members being surrounded by the frame members and disposed between the inner wall metal plate and the outer wall metal plate.

5. The apparatus of claim 4, wherein the heat insulating member is made mainly of aluminum oxide ($Al_2O_3$) and silicon oxide ($SiO_2$) and has density between 80 and 150 $kg/m^3$.

6. The apparatus of claim 1, further comprising a heat shield member disposed on the inner surface of the inner wall metal plates to cover the weld.

7. The apparatus of claim 6, wherein the heat shield member is formed so that a space between the heat shield member and the weld is formed.

8. The apparatus of claim 7, wherein the thickness of the heat shield member is less than 0.5 mm.

9. The apparatus of claim 4, wherein
each of the plurality of frame members has an inner flange and outer flange facing apart from each other, and a connector that extends along between the inner flange and the outer flange and connects them to each other,
an edge region of adjoining inner wall metal plates is fixed on the inner flange,
an edge region of adjoining outer wall metal plates is fixed on the outer flange, and
each heat insulating member has an engagement portion that engages in a concave portion of one of the frame members, defined by the inner flange, outer flange and connector of the frame member.

10. The apparatus of claim 9, wherein each frame member has an H-shaped cross section.

11. An apparatus for fabricating a porous glass preform from a base glass rod, the apparatus comprising:
base material grippers configured to support the base glass rod;
a rotary motor that rotates the base material grippers; and
a reaction vessel comprising:
an inner wall having an inner surface and an opposing outer surface, the inner surface bounding an enclosed chamber, the inner wall being comprised of a plurality of rectangular inner wall metal plates that are weld bonded together at adjoining edges thereof; and
a plurality of frame members having a higher stiffness than that of the inner wall metal plates, each frame member being fixed to the outer surface of the inner wall by a tightening or welding means so as to straddle one of the bonded edge regions between adjoining inner wall metal plates so that all of the bonded edge regions are straddled by the plurality of frame members; and
a burner configured to synthesize glass particles that are deposited onto the base glass rod within the chamber, the burner being configured to synthesize the glass particles by a flame hydrolysis or oxidation reaction.

12. The apparatus recited in claim 11, wherein at least one of the frame members is fixed to both sides of the bonded edge region which is straddled by the frame member.

13. The apparatus recited in claim 11, wherein the reaction vessel further comprises an outer wall comprised of a plurality of outer wall metal plates having an inner surface and an opposing outer surface, the outer wall metal plates having shapes corresponding to the inner wall metal plates, the outer wall metal plates being positioned so that the inner surfaces of the outer wall metal plates face the outer surfaces of the inner wall metal plates, and edges of the outer wall metal plates are aligned with the edges of the inner wall metal plates.

14. The apparatus recited in claim 13, wherein each frame member comprises:

an inner flange fixed to the outer surface of the inner wall by the tightening or welding means so as to straddle the one of the bonded edge regions between adjoining inner wall metal plates;

an outer flange positioned against the inner surface of the outer wall so as to straddle the edge region between adjoining outer wall metal plates that is aligned with the edge region straddled by the inner flange; and a connector that connects the inner flange to the outer flange.

15. The apparatus recited in claim 14, further comprising a plurality of heat insulating members positioned between the inner wall metal plate and the outer wall metal plate.

16. The apparatus recited in claim 14, further comprising a heat shield member positioned in the chamber against the inner surface of the inner wall so as to cover the weld of at least one of the bonded edge regions.

17. The apparatus recited in claim 16, wherein the heat shield member is formed so that a space is formed between the heat shield member and the weld.

18. The apparatus recited in claim 14, wherein each frame member has an H-shaped cross section.

\* \* \* \* \*